United States Patent
Bookbinder et al.

(10) Patent No.: US 8,322,166 B2
(45) Date of Patent: Dec. 4, 2012

(54) METHOD OF MANUFACTURING OPTICAL FIBER WITH SELECTED DRAW TENSION

(75) Inventors: Dana Craig Bookbinder, Corning, NY (US); Ming-Jun Li, Horseheads, NY (US); Peter Joseph Ronco, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 33 days.

(21) Appl. No.: 12/951,175

(22) Filed: Nov. 22, 2010

(65) Prior Publication Data

US 2012/0125053 A1 May 24, 2012

(51) Int. Cl.
*C03B 37/025* (2006.01)
(52) U.S. Cl. .............. 65/537; 65/533; 65/378
(58) Field of Classification Search .............. None
See application file for complete search history.

(56) References Cited

U.S. PATENT DOCUMENTS

| | | | |
|---|---|---|---|
| 5,396,323 A * | 3/1995 | Abbott et al. | 356/73.1 |
| 5,961,681 A | 10/1999 | Tateishi et al. | |
| 6,438,303 B1 * | 8/2002 | Abbott et al. | 385/123 |
| 6,532,773 B1 * | 3/2003 | Mazzarese et al. | 65/378 |
| 2005/0126227 A1 * | 6/2005 | Collaro | 65/378 |
| 2008/0166094 A1 * | 7/2008 | Bookbinder et al. | 385/124 |

FOREIGN PATENT DOCUMENTS

| | | |
|---|---|---|
| EP | 0479120 | 9/1991 |
| JP | 2001220167 | 8/2001 |
| KR | 2009095247 | 9/2009 |
| KR | 2009095247 A * | 9/2009 |

OTHER PUBLICATIONS

Presby "Calculation of bandwidth from index profiles of optical fibers. 2: Experiment", Oct. 1, 1979, Applied Optics vol. 18, No. 19 pp. 3249-3255.*
KR20090095247 Machine Translation from Korean Patents Website.*
English Translation of Korean Publication KR1020090095247A, dated Apr. 2012.*
KR20090095247 Machine Translation from Korean Patents Website performed Apr. 2012. (Provided in first office action—added date translation performed).*
JP2001-220167 Machine Translation from JPO website performed Oct. 2012.*

* cited by examiner

*Primary Examiner* — Matthew Daniels
*Assistant Examiner* — Lisa Herring
(74) *Attorney, Agent, or Firm* — Robert L. Carlson

(57) ABSTRACT

A method of manufacturing an optical fiber includes providing a preform in a furnace, and drawing a plurality of optical fibers from the preform at a plurality of different draw tensions. A bandwidth characteristic of each of the optical fiber is drawn at the different draw tensions is measured. A draw tension setpoint is selected based on the measured bandwidth characteristic of each optical fiber and the draw tension is adjusted to the selected draw tension setpoint. The method further includes drawing from the preform a tuned optical fiber at the selected draw tension setpoint which provides peak bandwidth.

17 Claims, 4 Drawing Sheets

METHOD OF MANUFACTURING OPTICAL FIBER WITH SELECTED DRAW TENSION

BACKGROUND

The present invention generally relates to a method of manufacturing optical fiber, and more particularly relates to manufacturing optical fiber in a fiber draw production system to achieve desired bandwidth characteristics.

Conventional manufacturing processes for producing optical fibers typically include drawing optical fiber from a heated glass preform in a draw furnace, cooling the drawn fiber, and coating the fiber after it has sufficiently cooled. The bandwidth of multimode (MM) fiber (MMF) is generally limited by inter-modal chromatic dispersion. To minimize the inter-modal chromatic dispersion, MM fibers are typically designed with graded index $\alpha$-profiles. For an optimum bandwidth, the parameter $\alpha$ which is the refractive index profile variation typically is at a value near 2 for a typical drawn fiber. However, the bandwidth may be sensitive to profile changes from its optimum shape and departure from the optimum $\alpha$ parameter may result in a significant drop in the bandwidth. Achieving the optimum bandwidth requires precise profile control; however, it is generally difficult to make an optimum $\alpha$-profile due to the refractive index measurement for a given preform generally not having the precision required to determine accurately the $\alpha$ value, and the draw tension induced stress can change the refractive index profile. Thus, typically optimum draw tension cannot be accurately predicted due to inaccuracy of the profile measurement for a given preform. If the index profile in the fiber has a significant error in the $\alpha$ parameter, the fiber bandwidth may be low, which may result in poor selects for high bandwidth fibers.

SUMMARY

According to one embodiment, a method of manufacturing an optical fiber is provided. The method includes the steps of providing a preform in a furnace, and drawing a plurality of optical fibers from the preform at a plurality of different draw tensions. The method also includes the step of measuring a bandwidth characteristic of each of the optical fibers drawn at each of the different draw tensions. The method further includes the steps of selecting a draw tension setpoint based on the measured bandwidth characteristic of each optical fiber, adjusting the draw tension to the selected draw tension setpoint and drawing from the preform a tuned optical fiber at the selected draw tension setpoint.

According to another embodiment, a method of manufacturing an optical fiber is provided that includes the steps of providing a preform in a furnace, drawing a first optical fiber from the preform at a first draw tension, and measuring a bandwidth characteristics of the first optical fiber drawn at the first draw tension. The method also includes the steps of drawing a second optical fiber from the preform at a second draw tension, and measuring a bandwidth characteristic of the second optical fiber drawn at the second draw tension. The method further includes the steps of selecting a draw tension setpoint based on the measured bandwidth characteristics of the first and second optical fibers, adjusting the draw tension to the selected draw tension setpoint, and drawing from the preform a select optical fiber at the selected draw tension setpoint.

According to a further embodiment, a method of manufacturing an optical fiber including the steps of providing a preform in a furnace, drawn a first optical fiber from a preform at a first draw tension and measuring a bandwidth characteristic of the first optical fiber. The method also includes the steps of drawing a second optical fiber from the preform at a second draw tension, and measuring a bandwidth characteristic of the second optical fiber. The method further includes the step of selecting one of the first and second optical fibers based on the measured bandwidth characteristics of the first and second optical fibers.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
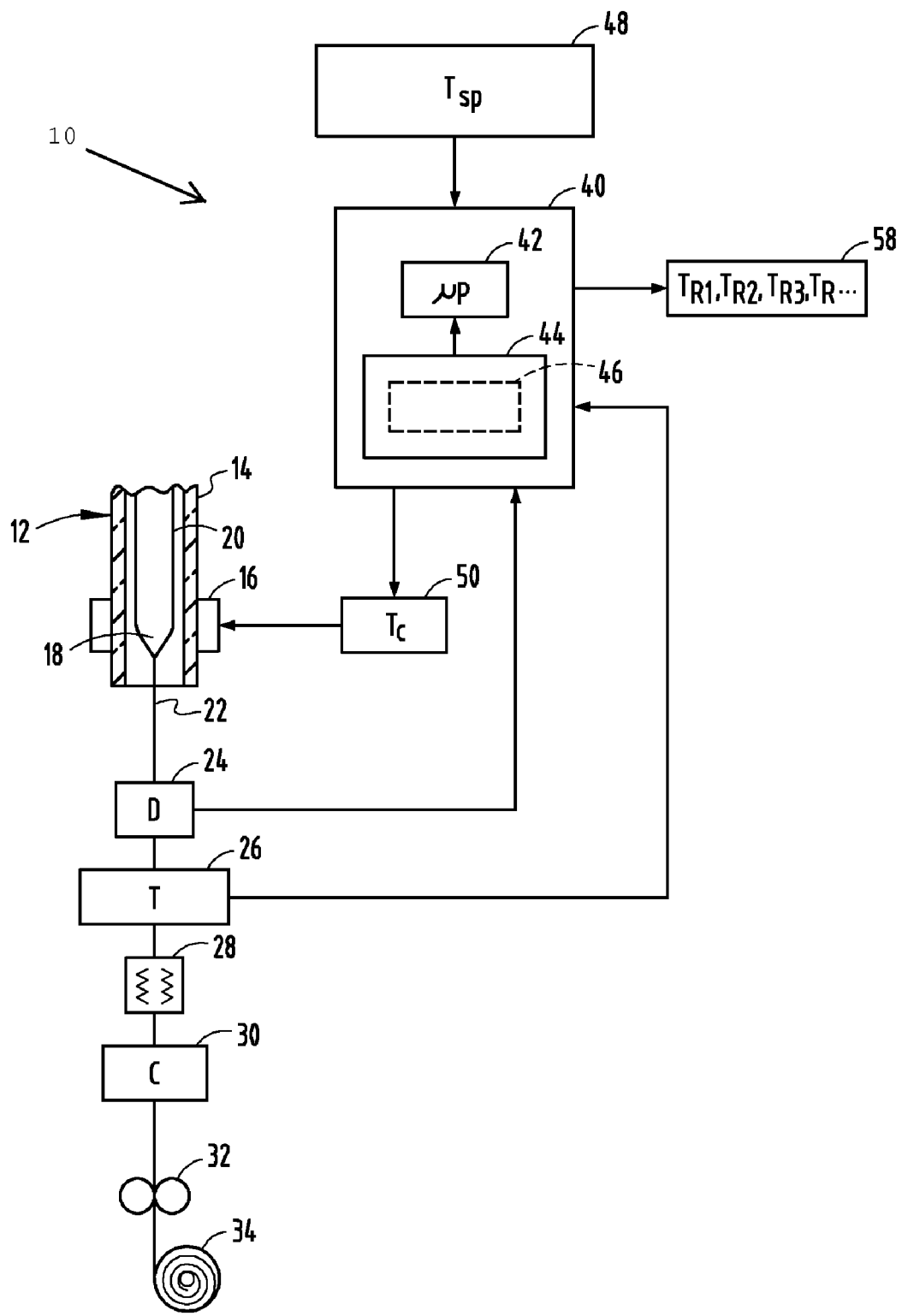
FIG. 1 is a schematic diagram of an optical fiber draw production system, according to one embodiment.

Reference will now be made in detail to the present preferred embodiments, examples of which are illustrated in the accompanying drawings. Whenever possible, the same reference numerals will be used throughout the drawings to refer to the same or like parts.

The optical fiber draw production system 10 and method 100 produces optical fibers through use of a fine tuning process that selects a draw tension setpoint for achieving optimum bandwidth characteristic(s) of a fiber produced from a given glass source preform. The terms "draw tension" and "tension" are used interchangeable herein. Embodiments of the optical fiber draw production system 10 and method 100 are herein described in connection with the drawing FIGS. 1-6, wherein like reference identifiers indicate the same or corresponding elements throughout the drawings. The phrase "bare optical fiber" as used herein means an optical fiber directly drawn from a heated glass source also referred to as a preform and prior to applying a protective coating layer to its outer surface (e.g., prior to the bare optical fiber being coated with a polymeric-based material). The optical fiber draw production system 10 and method 100 allows for the formation of select optical fiber having desired optimal bandwidth characteristics realized with an easy to implement process as disclosed herein.

Figure 6:
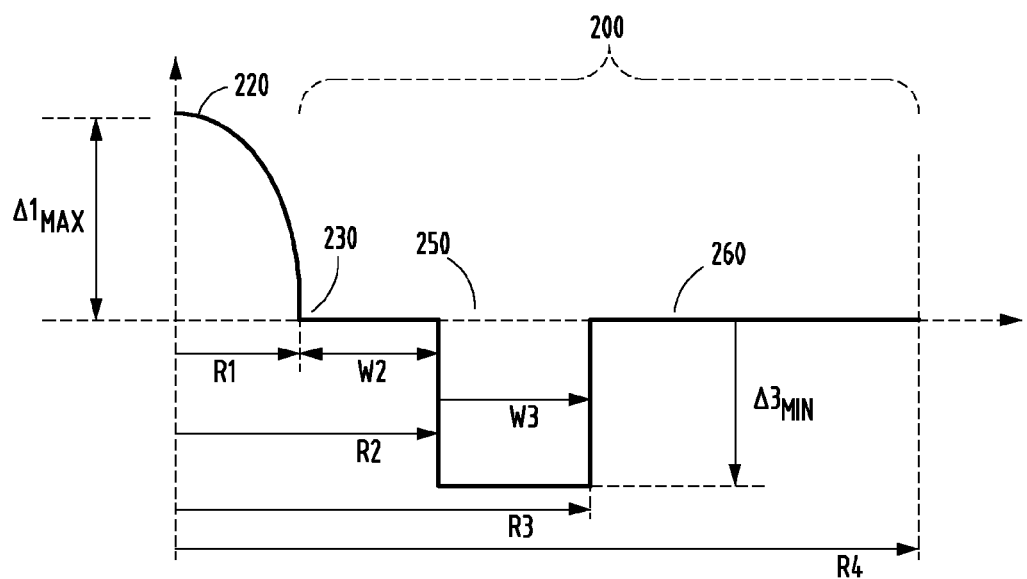
FIG. 6 is a refractive index profile for a multimode optical fiber, according to one example.

A relative refractive index profile curve is shown in FIG. 6 for a multimode optical fiber, according to one example. The core 220 is a parabolic core doped with germanium. The cladding layer 200 includes an inner cladding region 230 such as undoped silica, a depressed index region 250, such as fluorine doped silica in region 250, and an outer cladding region 260.

The "relative refractive index percent" or "refractive index delta" is defined as $\Delta \% = 100 \times (n_i^2 - n_{REF}^2)/2n_i^2$, where $n_i$ is the maximum refractive index in region i, unless otherwise specified. The relative refractive index percent is measured at 850 nm unless otherwise specified. Unless otherwise specified herein, $n_{REF}$ is the average refractive index of the outer annular region 260 of the cladding, which can be calculated, for example, by taking "N" index measurements ($n_{C1}$, $n_{C2}$, ... $n_{CN}$) in the outer annular region of the cladding (which in some preferred embodiments may be undoped silica), and calculating the average refractive index by:

$$n_C = (1/N) \sum_{i=1}^{i=N} n_{Ci}$$

As used herein, the relative refractive index is represented by $\Delta$ and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The overfilled bandwidth may be measured according to FOTP-204 using an overfilled launch. The minimum calculated effective modal bandwidth (Min EMBc) bandwidths may be obtained from measured differential mode delay spectra as specified by TIA/EIA-455-220.

Bandwidth was measured at 850 nm (unless another wavelength is specified) according to FOTP-204 with overfilled launch. It should be appreciated that bandwidth can be measured at other wavelengths, such as: 405, 630, 670, 780, 830, 915, 980, 1060, 1200, 1300, 1310, and 1550 nm.

The term "α-profile" or "alpha profile" refers to a relative refractive index profile, expressed in terms of $\Delta(r)$ which is in units of "%," where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero with respect to an outer annular cladding region 260, and r is in the range $r_i \leq r \leq r_f$, where $\Delta$ is defined above, $r_i$ is the initial point of the α-profile, $r_f$ is the final point of the α-profile, and α is an exponent which is a real number. For a profile segment beginning at the centerline (r=0), the α-profile has the simpler form $$\Delta(r) = \Delta(0)(1 - [|r|/(r_1)]^\alpha),$$

where $\Delta(0)$ is the refractive index delta at the centerline.

Referring to FIG. 1, the optical fiber draw production system 10 is generally shown, according to one embodiment. The fiber draw production system 10 includes a draw furnace 12 that includes a heating element 16 and a muffle 14 that is heated to a temperature of about 2,000° C., according to one embodiment. A glass preform 20 is disposed vertically in the muffle 14 of the draw furnace 12 and optical fiber is drawn from the heated preform 20 in the form of a bare optical fiber 22. The heating element 16 supplies heat to at least the bottom portion of the preform 20.

The preform 20 may be constructed of any glass material and may be doped and otherwise processed suitable for the manufacture of optical fibers. The preform 20 may be an entire core preform having a core with cladding or may be any optical fiber preform produced from the original core preform, commonly referred to as canes having cladding. Typically two or more optical fiber performs, such as five optical fiber performs may be formed from a single core preform for use in the furnace 12 to draw optical fiber. It should be appreciated that each preform may have a different refractive index measurement and it is generally difficult to make an optimum α-profile for a given core preform based on variations in the processing of the preform and drawing of the preform. The α-profile for a given preform can be measured using a refractive index measurement technique such as a Preform Analyzer refractive index measurement system (Photon Kinetics Instruments, Beaverton, Oreg.) and a desired α-profile can be achieved to provide for a rough tuned preform. The method disclosed herein draws fiber at various draw tensions, measures the bandwidth of the fiber drawn at these various draw tension, and selects the optimum draw tension for providing optimal bandwidth from a given fiber as a fine tuning process.

Optical fiber 22 is pulled from a root portion 18 of the preform 20 by a tractor 32. After leaving muffle 14, the bare optical fiber 20 encounters a diameter monitor (D) 24 which provides a signal that is used in a feedback control loop to regulate speed of the tractor 32 to maintain a constant fiber diameter. The bare optical fiber 22 then passes through a fiber tension measurement device (T) 26 that measures the tension of the optical fiber 22 and provides a feedback control loop to regulate the tension of the fiber 22 to maintain a desired draw tension setting that provides for high bandwidth fiber. One example of a fiber tension measurement device 26 is disclosed in EP 0479120 A2 which is hereby incorporated herein by reference. Once the bare optical fiber 22 is drawn from the preform 20, the bare optical fiber 22 is cooled in a cooling tube 28 or treatment device which may be coupled to or remote from the exit of the furnace 12, and fiber 22 subsequently is coated by coater 30 which may apply a polymeric-based coating material to the outside surface of the bare optical fiber 22. The coated fiber may also pass through a coating curing apparatus (not shown). The coated fiber 22 is then wound onto a spool or reel 34. The bandwidth of the individual fibers is measured off-line.

The fiber draw production system 10 is also shown having a tension controller 40 which may be implemented as a computer having a microprocessor 42 (μP) and memory 44, according to one embodiment. It should be appreciated that any digital and/or analog processing circuitry and memory storage medium may be employed. The controller 40 receives the output of the diameter monitoring device 24 (D) and the output of the fiber tension measurement device 26 (T) and may process the inputs with one or more routines. The controller 40 also provides an output 58 such as to a display or other human machine interface (HMI), for a user to view tension values indicative of the tension drawn from each fiber wound on each reel, e.g., $T_{R1}$, $T_{R2}$, $T_{R3}$, etc. It should be appreciated that optical fiber may be drawn at different fiber tensions to achieve different values of the index α-profiles and hence different bandwidth characteristics of the optical fibers. A user selected tension setpoint ($T_{SP}$) 48 is provided as an input to the controller 30 (C) to allow a user to select a desired tension setpoint to achieve a desired bandwidth characteristic of the optical fiber being produced. The controller 46 generates a temperature control ($T_C$) output 50 in response to the user selected tension setpoint ($T_{SP}$) which is used to control temperature of the heating element 18 in the furnace 12. The temperature control $T_C$ may adjust the temperature of the furnace 12 to achieve a desired fiber draw tension, according to one embodiment. Typically, an increase in the temperature of the furnace 12 will cause a decrease in the tension of the drawn fiber, whereas a decrease in the temperature of the furnace 12 will cause an increase in the temperature of the drawn fiber. The temperature of the furnace may be adjusted with a feedback loop until the draw tension reads the user selected tension setpoint. According to another embodiment, the tension of the drawn fiber may be adjusted by adjusting speed of the fiber drawn by the tractor 32 which may be controlled by the controller 40 responsive to the user selected tension setpoint.

The fiber draw production system 10 and method 100 provides for a preform in a furnace, draws a plurality of optical fibers from the preform at a plurality of different draw tensions, measures a bandwidth characteristic of each of the optical fibers at each of the different draw tensions, selects a draw tension setpoint based on the measured bandwidth characteristic of each optical fiber, adjusts the draw tension to the draw tension setpoint and draws from the preform a select tuned optical fiber at the selected draw tension setpoint. The draw tension setpoint may be the tension value that results in the highest bandwidth fiber. The draw tension may be adjusted by adjusting temperature of the preform of the furnace, according to one embodiment. The draw tension may be adjusted by adjusting tension of the drawn fiber, according to another embodiment. In one embodiment, the preform may include a doped core and a cladding and the cladding may include fluorine. The core can comprise silica doped with $GeO_2$, $P_2O_5$, $Al_2O_3$, $TiO_2$ and F. The cladding may include an annular ring of doped silica, including fluorine doped silica. The cladding may include doped silica. The preform may be in the form of a single preform for drawing multiple fibers or may include a plurality of optical fiber performs formed from the same core preform.

Figure 2:
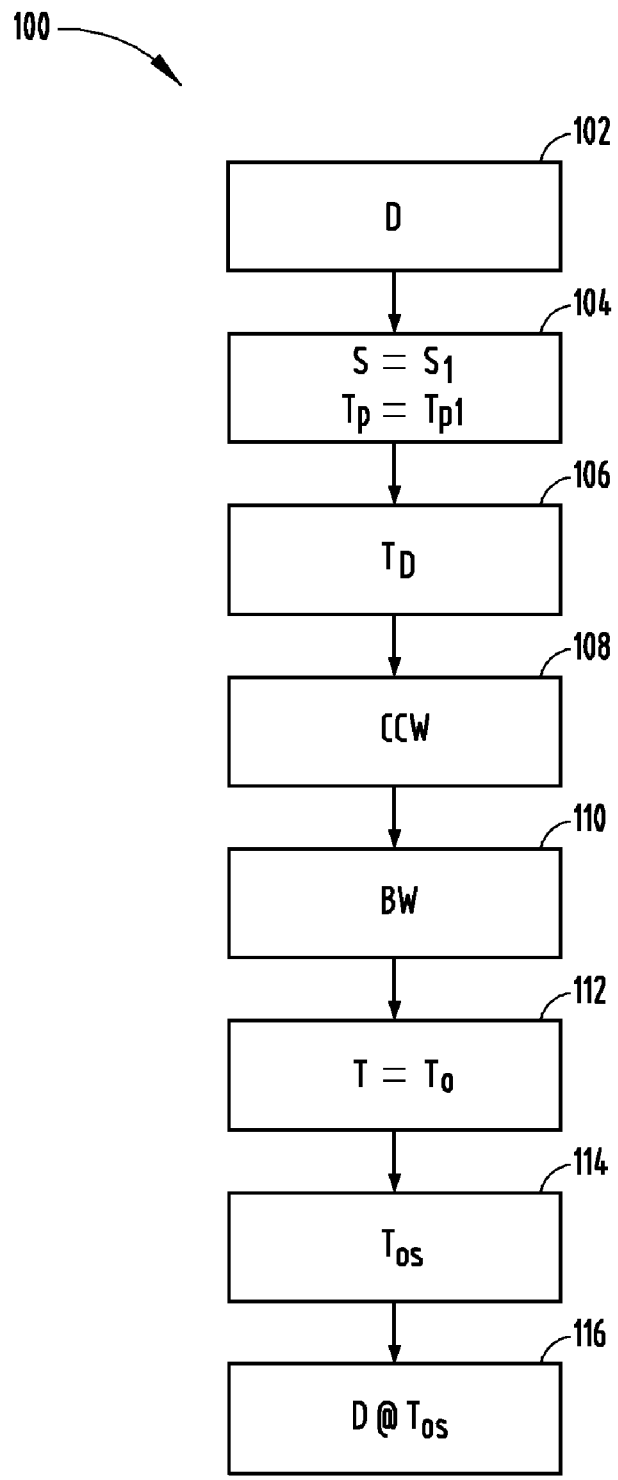
FIG. 2 is a flow diagram illustrating a method of manufacturing the fiber at a selectable draw tension, according to one embodiment.

The method 100 of manufacturing an optical fiber is illustrated in FIG. 2, according to one embodiment. Method 100 includes step 102 (D) of providing a prepared glass preform in a furnace at a temperature sufficient to draw optical fiber from the preform as desired. The furnace may be controlled at a temperature around 2,000° C. The preform may include an optical fiber preform that may be prepared by drawing the core preform into a plurality of canes which may be overclad to form the plurality of optical fiber preforms and one of which is inserted into the furnace at a time. Method 100 includes step 104 of drawing the fiber at a draw speed set by speed setpoint $S_1$ and a furnace temperature $T_P$ set at temperature $T_{P1}$. Next, at step 106, method 100 monitors the fiber draw tension $T_D$ of the drawn fiber. At step 108 (CCW), method 100 cools the fiber, coats the fiber, and winds the fiber onto one or more reels. Method 100 then proceeds to step 110 to measure off-line the bandwidth (BW) of each fiber drawn at different fiber tensions. In one embodiment, fibers drawn at different tensions are wound onto different reels and the fiber on each reel produced at a known draw tension is tested to determine the bandwidth of a fiber for a corresponding draw tension. The amount of fiber drawn onto a reel at a given draw tension may vary. For example, 3 to 5 kilometers of fiber produced at a given draw tension may be wound onto a reel and tested for bandwidth. The preform may produce approximately 800 kilometers of fiber, and the remaining fiber from the preform may be drawn at the selected tension setpoint.

The bandwidth of each fiber is determined by applying a signal to each fiber on each reel and measuring bandwidth characteristics at a desired signal wavelength, such as 850 nanometers. Based on the measured bandwidth characteristic (s), a user then selects the draw tension (T) at the optimum bandwidth to set the optimal draw tension $T_O$. At step 114, the user selected tension setpoint $T_{OS}$ is adjusted based on the optimal draw tension $T_O$ to achieve the optimal fiber draw tension by adjusting the temperature of the furnace to achieve the desired draw tension setpoint $T_{OS}$. Method 100 then draws the remainder of the fiber from the preform or other optical fiber preforms produced from the same core preform at the user selected tension setpoint $T_{OS}$ in step 116 to provide a supply of the optimum optical fiber with optimum bandwidth characteristics.

The method 100 advantageously draws high bandwidth multimode fiber by using a change in draw tension to fine tune the index α-profile, particularly for manufacturing optimal selects of multimode fibers. In one embodiment, a preform is drawn with variable draw tensions during the fiber draw process such that a portion of the preform is drawn into a first fiber at a set tension and wound onto one reel, and then another portion of the preform is drawn into a second fiber at a different tension and wound onto another reel, and the process continues throughout use of the preform to produce a sufficient number of selections for selecting the fiber with the peak bandwidth. In doing so, the optimum bandwidth can be achieved and the available selects (percentage of the total fiber produced) for high bandwidth fibers are increased. In another embodiment, small portions of the same preform are drawn to fiber, each reel of fiber being drawn at a different tension. The bandwidth is measured for fiber on each reel and then the remainder of the preform is drawn into fiber at the fiber draw tension that supplied the highest bandwidth. Further, sister canes from the same starting preform can be drawn at the tension that produced the highest bandwidth fibers from the tension mapping. The method can fine tune the index α-profile of a multimode fiber to reach the peak bandwidth and is easy to implement in a manufacturing process to increase the selects of high bandwidth fibers.

Figure 3:
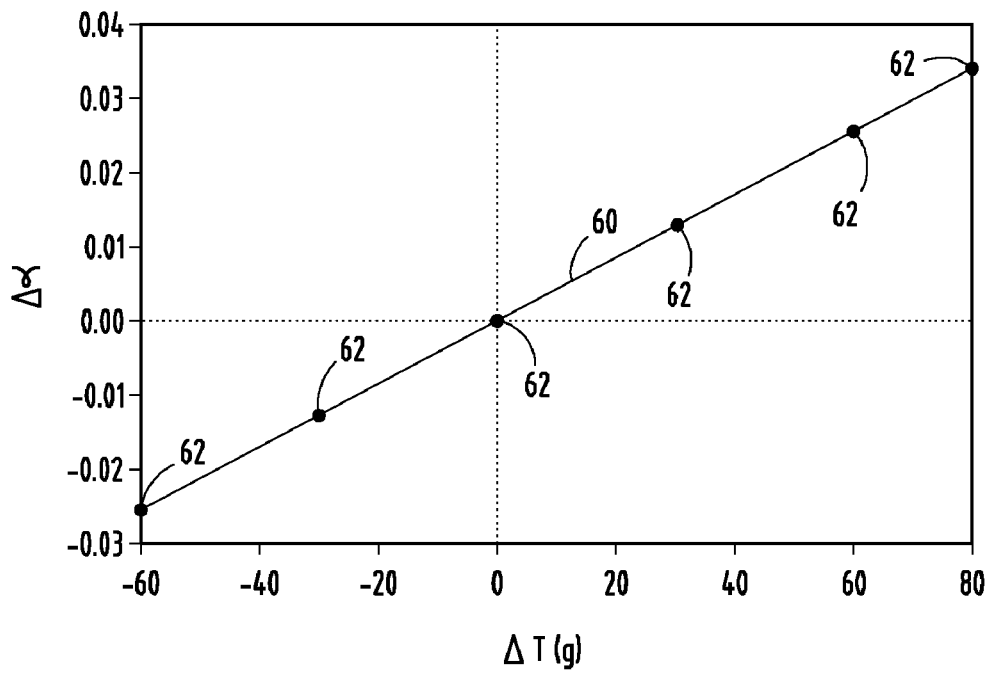
FIG. 3 is a graph illustrating changes in the index $\alpha$-profile with changes in fiber draw tension, according to one example.

The fiber draw production system 10 and method 100 makes high bandwidth multimode fibers by drawing a fiber from a preform with variable draw tensions. The draw tension induces mechanical stress in the fiber, which changes the refractive index profile. The change in refractive index profile can be equated to an effective change in the α value of the refractive index profile. The α-profile for a given optical fiber can be measured using the refractive near field (RNF) or Mach-Zehnder interferometry measurement techniques. The refractive index profile for a given fiber can also be modeled using the input parameters of the chemical composition and glass transition radial profile, outer fiber diameter, draw tension and the stress-optic coefficients. Referring to FIG. 3, the impact caused by changes in draw tension on the α value is illustrated, according to one example. In this example, the fiber has a graded index $GeO_2$ doped silica core (1% delta index relative to the silica outer cladding, with an alpha of about 2.1 and a core radius of 25 microns) and a silica outer cladding, wherein the overall fiber is 125 microns in diameter. As seen, the measured effective α value changes as a function of draw tension changes. In this example, for each 100 gram change in draw tension, the effective α value changes by about 0.043 as shown by points 62 on line 60 on the graph. By changing the draw tension, the α-profile value can be changed to fine tuned to fiber selects to achieve the maximum bandwidth fiber. Optical fibers having a different radial chemical composition will have a different slope of change in alpha with change in draw tension. For example, a fiber may have a graded index GeO$_2$ doped silica core, a cladding of pure silica containing a fluorine doped low index ring. In this example, the relative refractive index delta of the core was about 0.94 percent relative to the silica cladding with an alpha ($\alpha$) of about 2.1. The ring had about 1 micron offset to the core with a refractive index change of about −0.45 percent and a width of about 5 micrometers, and a silica outer cladding. In this example, for each 100 gram change in draw tension, the effective $\alpha$ value changes by about 0.026.

Figure 4:
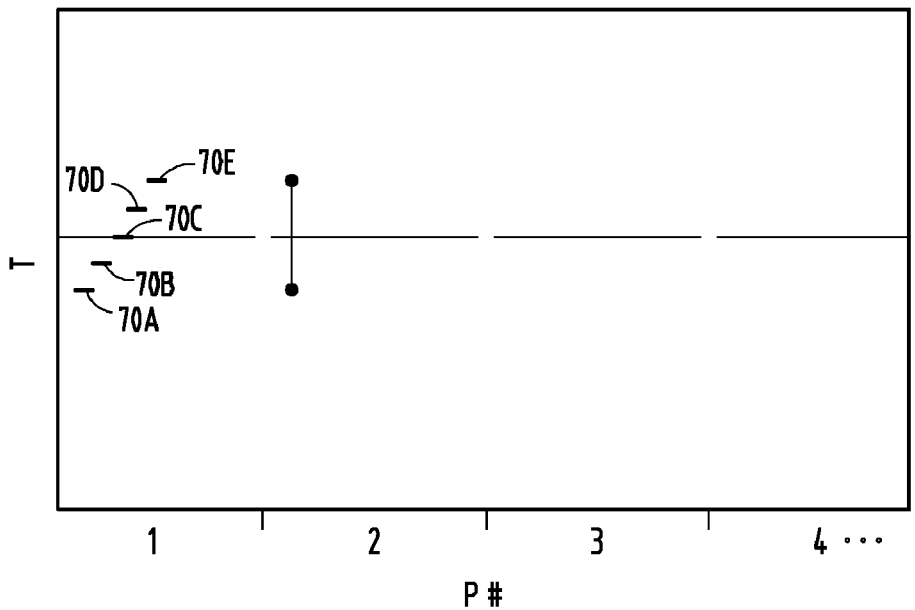
FIG. 4 is a graph illustrating index $\alpha$-profiles for optical fibers drawn at different tensions for a plurality of canes produced from a preform, according to one example.

Referring to FIG. 4, one example of the method of manufacturing optical fiber with optimal bandwidth selects is illustrated. In this embodiment, five optical fibers are drawn onto five separate reels, each fiber being drawn at a different draw tension (T) from a first optical fiber preform (P). The draw tension of each of the five fibers is illustrated by lines 70A-70E. Each fiber is then measured for one or more bandwidth characteristics, and the bandwidth characteristics from each fiber are analyzed to determine the optimum fiber and hence the optimum draw tension. The remainder of the preform including the remainder of the first optical fiber preform and all other optical fiber preforms produced from the starting core preform is then drawn at the selected tension setpoint which produced the highest bandwidth fiber.

Figure 5:
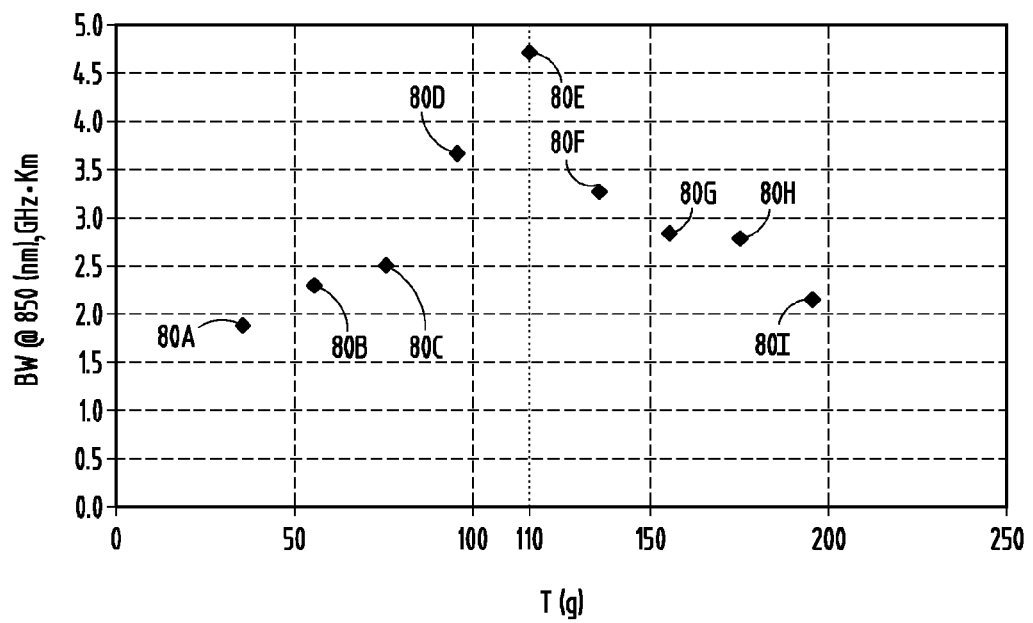
FIG. 5 is a graph illustrating measured bandwidth as a function of the draw tension for selecting a draw tension setpoint, according to one embodiment.

One example of measured bandwidth as a function of the draw tension is shown according to one embodiment in FIG. 5. In this example, a multimode preform with an $\alpha$-profile value in the core was made by doping the core with GeO$_2$. The physical core diameter was 50 microns. The cladding was pure silica containing a fluorine doped low index ring. The refractive index change in the center of the core was about 0.94 percent relative to the pure silica. The ring had about 1 micrometer offset to the core with a refractive index change of about −0.45 percent and a width of about 5 micrometers. The outer cladding fiber diameter was 125 microns. The measured $\alpha$-profile value in the preform was 2.10 as measured with a Preform Analyzer refractive index measurement system and the predicted bandwidth was 3.33 GHz·km at a wavelength of 850 nanometers. The preform was drawn at tensions (T) ranging from 30 to 195 grams. The measured bandwidth at a wavelength of 850 nanometers is illustrated as a function of the draw tension by the data points 80A-80I. The maximum bandwidth of 3.5 GHz·km was achieved with draw tensions between 90 and 130 grams, with an optimum bandwidth of 4.75 GHz·km at approximately 110 grams of tension shown by data point 80E. Thus, in this example, a user may select a draw tension setpoint of about 110 grams to make optimum performance fiber. Additional fiber can be drawn from this preform at a similar tension, e.g. about 110 grams of tension in order to produce the optimum and highest bandwidth fiber from the remainder of the preform. Likewise, additional fiber can be drawn at a similar tension (e.g. about 110 grams of tension) from other preforms which were manufactured from the same core preform as this tension tested optical fiber preform.

According to another embodiment, a multimode preform with an $\alpha$-profile in the core was made by doping the core with GeO$_2$. The cladding was pure silica in this example. The refractive change in the center of the core was about 1 percent relative to the pure silica. The measured $\alpha$-profile value in the preform was 2.13 as measured with a Preform Analyzer refractive index measurement system (Photon Kinetics Instruments, Beaverton, Oreg.), and the predicted bandwidth was 2.73 GHz·km at a wavelength of 850 nanometers. The preform was drawn into 4 Km segments with tensions from 50 to 170 grams draw tensions with a 20 gram increment. The resultant fibers had core diameters of about 50 micrometers. The fiber diameter was 125 microns. The bandwidth was about 2.0, 3.7, 5.4, 6.4, and 4.3 GHz·km, at draw tensions of 90, 110, 130, 150, and 170 grams, respectively. Maximum bandwidth of over 5 GHz·km was achieved with draw tension of 130 grams and 150 grams. Thus, in this example, a user may select a draw tension setpoint of about 130-150 grams to make optimum performance fiber. Additional fiber can be drawn from this preform at about 130-150 grams of tension in order to produce the optimum and highest bandwidth fiber from the remainder of the preform. Additional fiber can also be drawn from optical fiber preforms which are formed from the same core preform, i.e. at about 130-150 grams of tension in order to produce the optimum and highest bandwidth fiber from the additional optical fiber preforms. The $\alpha$-profile of the optical fiber produced may be in the range of 2.0-2.2, in some embodiments, 2.05-2.15 when the optical fiber is optimized for operation at 850 nm The optical fiber may have a physical diameter in the range of 60-200 microns, according to one embodiment, and more preferably in the range of 80-125 microns.

The bandwidth characteristic used for selecting the draw tension may use a bandwidth threshold value of greater 2.0 GHz·km according to one embodiment, more preferably greater than 4.0 GHz·km, and in some embodiments greater than 5.0 GHz·km for a wavelength of about 850 nanometers.

According to a further embodiment, a method of manufacturing an optical fiber is provided that includes the steps of providing a preform in a furnace, drawing a first optical fiber from the preform at a first draw tension, and measuring a bandwidth characteristic of the first optical fiber. The method also includes the steps of drawing a second optical fiber from the preform at a second draw tension, and measuring a bandwidth characteristic of the second optical fiber. The method further includes the step of selecting one of the first and second optical fibers based on the measured bandwidth characteristics of the first and second optical fibers. The method may further continue to draw further optical fibers from the preform at further different draw tensions, to measure the characteristics of the further optical fibers, and to select for use from the further optical fibers based on the measured bandwidth characteristics to select which of the optical fibers to employ. Accordingly, this embodiment allows for the selection of one or more fibers by users for various applications depending upon the bandwidth characteristics.

Variable draw tension results in changing the $\alpha$-profile due to the stress-optic effect in the fiber. Residual stresses that are incorporated into the fiber during the draw process may be a combination of thermal and mechanical stresses. Thermal stresses may be caused to the coefficient of thermal expansion (CTE) mismatch and mechanical stresses may be caused by viscosity mismatch between different radial locations in the fiber. For an optimum $\alpha$-profile in the starting preform with an $\alpha$-profile value of approximately 2, axial, radial and azimuthal stresses in the fiber exist which are able to impact the index through the stress-optic coefficient coefficient profile. The index profile of the fiber and therefore the bandwidth is controlled by the dopant level in the initial preform and the corresponding fiber and the stresses in the fiber setup during the draw process.

The system and method can select a draw tension for a given dopant profile in the preform to fine tune and therefore optimize the index profile bandwidth for a given fiber. This allows for the manufacture of optimal peak bandwidth capable fiber and the selection of fibers of differing bandwidths. The methods disclosed herein can be employed to make selectively available single more or multimode optical fibers for use in telecommunications applications.

It will be apparent to those skilled in the art that various modifications and variations can be made without departing from the spirit or scope of the claims.

What is claimed is:

1. A method of manufacturing an optical fiber, said method comprising the steps of:
   providing a first preform in a furnace;
   drawing a plurality of optical fibers from the first preform at a plurality of different draw tensions;
   measuring a bandwidth characteristic of each of the optical fibers drawn at each of the different draw tensions;
   selecting a draw tension setpoint based on the measured bandwidth characteristics of each optical fiber;
   adjusting the draw tension to the selected draw tension setpoint; and
   drawing from a second preform a select tuned optical fiber at the selected draw tension setpoint, wherein said second preform is formed from a core preform which is common to the first preform.

2. The method of claim 1, wherein the step of adjusting the draw tension comprises adjusting temperature of the preform in the furnace.

3. The method of claim 1, wherein the step of adjusting the draw tension comprises adjusting speed of the drawn fiber.

4. The method of claim 1, wherein the step of selecting the draw tension setpoint comprises selecting the draw tension setpoint that results in a bandwidth of at least 2.0 GHz·km.

5. The method of claim 1, wherein the step of selecting the draw tension setpoint comprises selecting the draw tension setpoint that results in a bandwidth of at least 4.0 GHz·km.

6. The method of claim 1, wherein the step of measuring a bandwidth characteristic comprises measuring the bandwidth characteristic at a wavelength of about 850 nanometers.

7. The method of claim 1, wherein the step of a bandwidth characteristic selecting the draw tension setpoint comprises selecting the draw tension setpoint that results in the highest bandwidth.

8. A method of manufacturing an optical fiber, said method comprising the steps of:
   providing a preform in a furnace;
   drawing a first optical fiber from the preform at a first draw tension;
   measuring a bandwidth characteristic of the first optical fiber drawn at the first draw tension;
   drawing a second optical fiber from the preform at a second draw tension;
   measuring a bandwidth characteristic of the second optical fiber drawn at the second draw tension;
   selecting a draw tension setpoint based on the measured bandwidth characteristics of the first and second optical fibers;
   adjusting the draw tension to the selected draw tension setpoint; and
   drawing from a remainder of the preform a third optical fiber at the selected draw tension setpoint.

9. The method of claim 8 further comprising the step of drawing optical fiber from the preform at a further plurality of draw tensions, measuring a bandwidth characteristic of each fiber, and selecting the draw tension setpoint based on the measured bandwidth characteristic of the optical fibers drawn at the plurality of draw tensions.

10. The method of claim 8, wherein the step of adjusting the drawn tension comprises adjusting temperature of the preform in the furnace.

11. The method of claim 8, wherein the step of adjusting the draw tension comprises adjusting speed of the drawn fiber.

12. The method of claim 8, wherein the step of selecting the draw tension setpoint comprises selecting the draw tension setpoint that results in a bandwidth of at least 2.0 GHz·km.

13. The method of claim 8, wherein the step of selecting the draw tension setpoint comprises selecting the draw tension setpoint that results in a bandwidth of at least 4.0 GHz·km.

14. The method of claim 8, wherein the step of measuring a bandwidth characteristic comprises measuring the bandwidth characteristic at a wavelength of about 850 nanometers.

15. The method of claim 8, wherein the step of selecting the draw tension setpoint comprises selecting the draw tension setpoint that results in the highest bandwidth.

16. A method of manufacturing an optical fiber, said method comprising the steps of:
   providing a preform in a furnace;
   drawing a plurality of optical fibers from the preform at a plurality of different draw tensions;
   measuring a bandwidth characteristic of each of the optical fibers drawn at each of the different draw tensions;
   selecting a draw tension setpoint based on the measured bandwidth characteristics of each optical fiber;
   adjusting the draw tension to the selected draw tension setpoint; and
   drawing from a remainder of the preform a select tuned optical fiber at the selected draw tension setpoint.

17. The method of claim 16, further comprising drawing additional preforms at said selected draw tension, said additional preforms formed from a core preform which is common to said first and second preforms.

* * * * *